United States Patent
Karapetkov et al.

(10) Patent No.: US 6,453,163 B1
(45) Date of Patent: Sep. 17, 2002

(54) METHOD TO RESTORE SUBSCRIBER RELATED INFORMATION IN A COMMUNICATION NETWORK DATA BASE SYSTEM

(75) Inventors: Stefan Karapetkov; Vincenzo Scotto Di Carlo, both of München; Wilhelm Müller, Wörth, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/269,623

(22) PCT Filed: Sep. 24, 1997

(86) PCT No.: PCT/DE97/02167

§ 371 (c)(1),
(2), (4) Date: Mar. 30, 1999

(87) PCT Pub. No.: WO98/15131

PCT Pub. Date: Apr. 9, 1998

(30) Foreign Application Priority Data

Sep. 30, 1996 (DE) .......................................... 196 40 288

(51) Int. Cl.[7] ................................................. H04Q 7/20
(52) U.S. Cl. ....................... 455/433; 455/426; 455/462; 455/465
(58) Field of Search ................................. 455/433, 426, 455/462, 465, 432, 435

(56) References Cited

U.S. PATENT DOCUMENTS 5,463,674 A 10/1995 Gillig et al.
5,594,942 A * 1/1997 Antic et al. .................. 455/433
5,619,552 A * 4/1997 Karppanen et al. ......... 455/433

FOREIGN PATENT DOCUMENTS

DE  43 43 335 A1  6/1995
WO  WO 96/29838  9/1996

OTHER PUBLICATIONS

8452 Wireless Networks Oct. 1, 1995, No. 3, Amsterdam, NL.

The GSM System Mobility and Security Management, pp. 470–473.

* cited by examiner

*Primary Examiner*—Lee Nguyen
(74) *Attorney, Agent, or Firm*—Bell, Boyd & Lloyd LLC

(57) ABSTRACT

A method for restoring subscriber-related information in a database system of a communication network wherein, to restore subscriber-related information in a first database system of a first communication network for subscribers which are registered as subscribers both in the first communication network and in a second communication network, a second database system for storing subscriber data records containing subscriber-related information, and a controller for storing the subscriber-related information from the subscriber data records of the databases of a number of cordless communication systems in a storage device, are provided in the second communication network. The controller is also used for transferring subscriber-related information requested by the first database system to the first communication network.

7 Claims, 1 Drawing Sheet

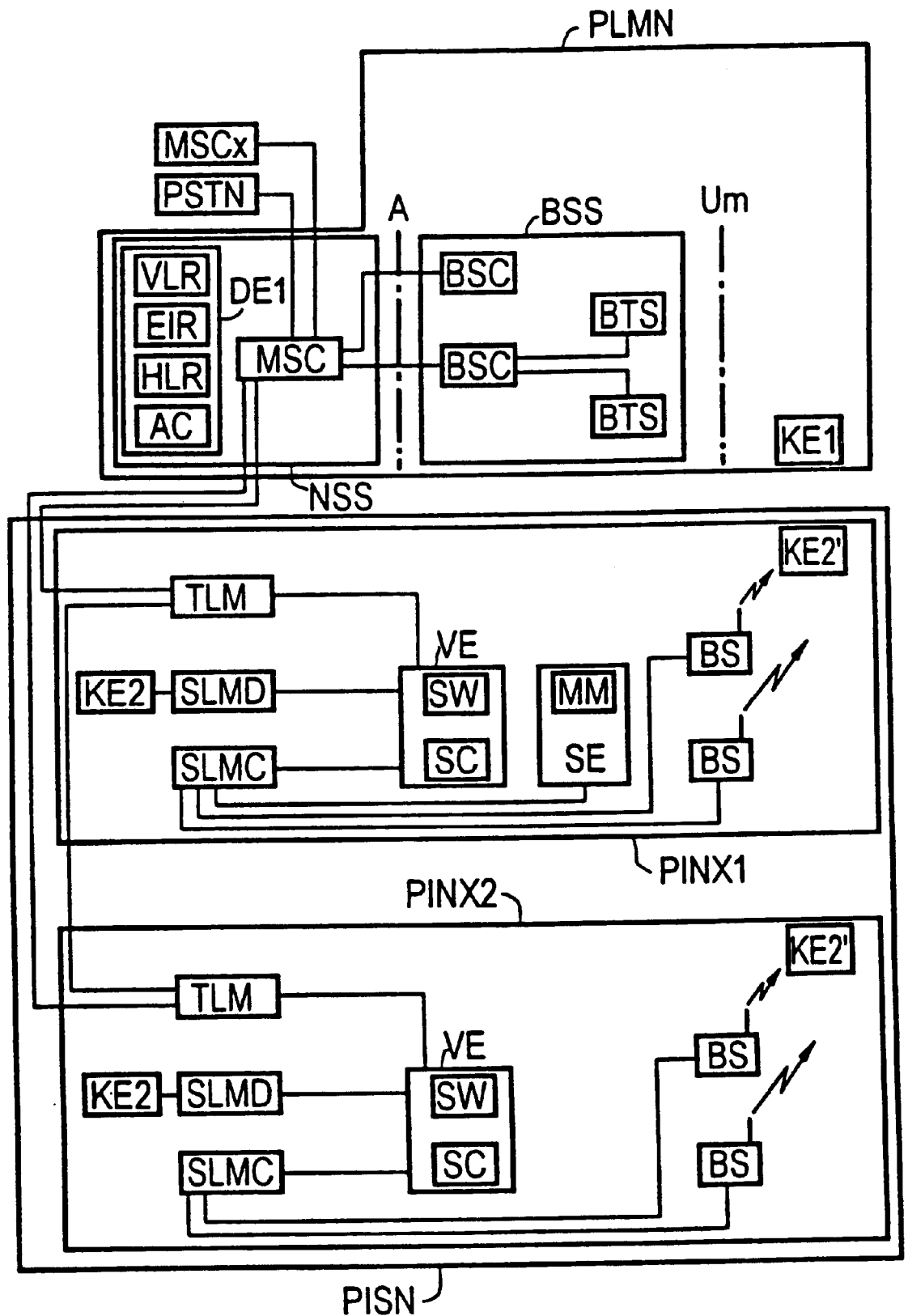

METHOD TO RESTORE SUBSCRIBER RELATED INFORMATION IN A COMMUNICATION NETWORK DATA BASE SYSTEM

BACKGROUND OF THE INVENTION

1. Field of the Invention

The present invention relates to a method for restoring subscriber-related information in a first database system of a first communication network if the corresponding subscribers are registered as subscribers both in the first communication network and in a second communication network, wherein a second database system for storing subscriber data records containing subscriber-related information is provided in the second communication network and there is a possibility that information dependent on the current location of the subscriber or terminal has to be restored. Such subscriber-related or terminal-related information can be, for example, information on the current availability of a subscriber or terminal, or current terminal-specific facility settings.

2. Description of the Prior Art

In the book by M. Mouly, M. B. Pautet, "The GSM System for Mobile Communications", 1992, F-91120 Paliseau, the updating of the database of the location of terminals in a mobile radio network and the restoration of subscriber-related or terminal-related information within a database after an incident is described especially on pages 470 to 473. In this case, only information on the availability of a subscriber or terminal within the mobile radio network is stored and, respectively, restored. In the method for restoring information on the location of a terminal within the mobile radio network as described here, the unsafe, or potentially wrong, information is marked as such in a first step. Then, other units of the mobile radio network are informed of the unsafe state of this information whereupon these units, too, mark the corresponding information as unsafe. To provide as little load as possible on the signaling load of the communication network, the unsafe data is restored or corrected only if an event related to the subscriber or the terminal occurs such as, for example, a radio contact initialized by the terminal. To ensure such a radio contact within a certain period of time, the information on the location of the subscriber or, respectively, the terminal is updated periodically; for example, once a day. The known method, which is only used within a mobile radio network, presupposes that a unit which can provide, for example, information on the current location of a terminal, receives a message that the corresponding data may not be correct because of a fault case. If there is such a message, this data is updated or corrected, if a certain action with respect to the terminal occurs. To ensure sure such an action within a certain period of time, it is known to initiate a periodic radio contact.

It is therefore an object of the present invention to provide a method for restoring subscriber-related or terminal-related information after a fault in a database system of a first communication network for storing such information for the case where a subscriber or terminal can be reached both via the first communication network and via a further communication network, wherein there is a possibility that information dependent on the current location of the subscriber or terminal has to be restored.

SUMMARY OF THE INVENTION

This object is achieved by a method of the present invention wherein, to restore subscriber-related information in a first database system of a first communication network the case where the corresponding subscribers are registered as subscribers both in the first communication network and in a second communication network, a second database system for storing subscriber data records containing subscriber-related information is provided in the second communication network, and a controller for storing in a storage device the subscriber-related information relevant to the first database system from the subscriber data records of the databases of a number of cordless communication systems and for transferring subscriber-related information requested by the first database system to the first communication network is provided in the second communication network. Control of the first database system determines potentially faulty subscriber-related information in the first database system and transfers a request message for requesting the corresponding correct information to the controller of the second communication network.

An embodiment of the method of the present invention provides that the individual cordless communication systems in each case transfer an updating message to the controller if the availability of a terminal allocated to a subscriber via this cordless communication system changes.

The first communication network can be a public communication network having a number of cordless communication systems and the second communication network can be a private communication network having a number of cordless communication systems. The terminals which can be wirelessly connected are, in this case, cordless terminals. More specifically first communication network can be, for example, a mobile radio network. In this case, the terminals which can be wirelessly connected also can be dual-mode terminals having a cordless communication part and a mobile radio communication part.

In an embodiment of the method of the present, the controller stores in matrix form the subscriber-related information relevant to the first database system.

Additional features and advantages of the present invention are described in, and will be apparent from, the Detailed Description of the Preferred Embodiments and the Drawings.

DESCRIPTION OF THE DRAWINGS

FIG. 1 shows, in diagrammatic form a block diagram of a network arrangement consisting of a mobile radio network, a public fixed network and a private network having two cordless communication devices. Specifically, FIG. 1 shows a block diagram of a mobile radio network PLMN including a network subsystem NSS for setting up connection between at least one mobile subscriber and other subscribers and for mobility management. The mobile radio network PLMN also includes a base station subsystem BSS for controlling the radio links to mobile stations. In FIG. 1, a mobile station is shown, for example, as communication terminal KE1.

The main unit of the network subsystem NSS is a mobile services switching center MSC which communicates with base station controllers BSC via an A-interface A. In the one base station subsystem BSS shown in FIG. 1, a base station controller BSC is shown which, if needed, connects a number of base stations BTS with the mobile services switching center MSC.

The mobile services switching center MSC is used as the usual switching node and, in addition, provides all functionalities needed for dealing with mobile subscribers such as registration, authentication, updating of the location, call transfer between base stations and call control to a subscriber registered as present in an area of a base station. The mobile services switching center MSC also establishes connections to the public networks PSTN and, in the example shown in FIG. 1, to another mobile services switching center MSCx and to two cordless communication facilities PINX1, PINX2 of a private network. A home location register HLR and a visitor location register VLR are used, jointly with the mobile services switching center MSC, for call control and location finding of subscriber terminals in the mobile radio network.

Two further registers of the network subsystem NSS, namely an equipment identity register EIR and an authentication register AC are used for authentication and for safety purposes. The equipment identity register EIR contains a list of all mobile sets licensed in the network, each mobile station being identified by its international mobile equipment identity IMEI. In the authentication center AC, copies of all secret keys, which are stored in each case in the SIM card of the subscriber, are used for authentication and for encryption via the radio channel.

Accordingly, a database associated with each subscriber is available for each subscriber within the mobile radio network PLMN, in which its classes of service, its location and other information are stored retrievable.

The mobile services switching center MSC communicates with the HLR, VLR, AC and EIR registers by using a protocol called MAP (mobile application part protocol). This standardized MAP protocol contains signaling functions which are required for providing services needed in a mobile network.

FIG. 1 also shows two cordless communication facilities PINX1, PINX2 of a private network, in each case including a switching system VE for setting up and clearing down connections between subscribers. The two cordless communication facilities PINX1, PINX2 are shown to be identical in this figure and will be described only once. The switching system VE contains a switching node SW and a switching controller SC. The switching system VE can be connected to a public communication network PSTN and to the mobile services switching center MSC of the mobile radio network PLMN via a network trunk interface module TLM. The switching system VE can set up connections to communication terminals KE2, KE2' via subscriber line modules SLMD and SLMC. The subscriber line module for digital terminal SLMD shown by way of example in the figure can be connected to a communication terminal KE2 via a line. The cordless subscriber line module SLMC shown in FIG. 1 can be connected to a communication terminal KE2' via a base station BS and a radio link.

FIG. 1 also shows a storage device MM and a controller SE for storing the subscriber-related information relevant to the first database system DE1 from the subscriber data records of the databases of the cordless communication systems PINX1, PINX2 In the storage device MM.

To restore subscriber-related information in a first database system DE1 of the mobile radio network PLMN for the case where the corresponding subscribers are registered as subscribers both in the mobile radio network PLMN and in a cordless communication network PISN, a controller SE for storing the subscriber-related information relevant to the first database system DE1 from the subscriber data records of the databases of a number of cordless communication systems PINX1, PINX2 in the storage device MM is provided in the cordless communication network PISN. The controller SE also is used for transferring subscriber-related information requested by the first database system DE1 to the mobile radio network PLMN. Control of the first database system DE1 determines potentially faulty subscriber-related information in the first database system DE1 and transfers a request message for requesting the corresponding correct information to the controller SE of the cordless communication network PISN.

Although the present invention has been described with reference to specific embodiments, those of skill in the art will recognize that changes may be made thereto without departing from the spirit and scope of the invention as set forth in the hereafter appended claims.

What is claimed is:

1. A method for restoring subscriber-related information in a first database system of a first communication network if the corresponding subscribers are registered as subscribers both in the first communication network and in a second communication network having a plurality of cordless communication systems, the method comprising the steps of:

allocating terminals, which can be wirelessly connected, to individual subscribers wherein each of the terminals is registered and can be operated as a subscriber terminal in one of the plurality of cordless communication systems and can be operated as a visiting terminal in the remaining plurality of cordless communication systems;

providing a second database system including a plurality of databases of individual cordless communication systems of the second communication network for storing subscriber data records containing subscriber-related information; and providing a controller in the second communication network for storing the subscriber-related information relevant to the first database system from the subscriber data records of the databases of the plurality of cordless communication systems in a storage device and for transferring the subscribe-related information, retrieved from the first database system, to the first communication network;

wherein the first communication network is a public communication network comprising a plurality of cordless communication systems and the second communication network is a private communication network comprising a plurality of cordless communication systems.

2. A method as claimed in claim 1, further comprising the step of:

transferring, via the individual cordless communication systems, an updating message to the controller if the availability of a terminal allocated to a subscriber via the cordless communication system changes.

3. A method as claimed in claim 1, wherein the terminals which can be wirelessly connected are cordless terminals.

4. A method as claimed in claim 1, wherein the first communication network is a mobile radio network.

5. A method as claimed in claim 1, wherein the terminals which can be wirelessly connected are dual-mode terminals comprising a cordless communication part and a mobile radio communication part.

6. A method as claimed in claim 1, wherein the subscriber-related information transferred to the controller of the first database system includes at least information on the current availability of the respective subscriber.

7. A method as claimed in claim 1, wherein the controller stores in matrix form the subscriber-related information relevant to the first database system.

* * * * *